(12) United States Patent
Asada et al.

(10) Patent No.: US 12,384,057 B2
(45) Date of Patent: Aug. 12, 2025

(54) FLEXIBLE ROBOTIC LIMBS INCLUDING ROLLING CONTACT JOINTS

(71) Applicant: Massachusetts Institute of Technology, Cambridge, MA (US)

(72) Inventors: Haruhiko Asada, Lincoln, MA (US); Kentaro Barhydt, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/443,618

(22) Filed: Feb. 16, 2024

(65) Prior Publication Data
US 2024/0351225 A1    Oct. 24, 2024

Related U.S. Application Data

(60) Provisional application No. 63/497,751, filed on Apr. 24, 2023.

(51) Int. Cl.
*B25J 18/06* (2006.01)
*B25J 9/06* (2006.01)

(52) U.S. Cl.
CPC .................. *B25J 18/06* (2013.01); *B25J 9/06* (2013.01)

(58) Field of Classification Search
CPC .................. B25J 9/142; F15B 15/103
See application file for complete search history.

(56) References Cited

U.S. PATENT DOCUMENTS 3,932,045 A    1/1976    Hillberry et al.

FOREIGN PATENT DOCUMENTS

WO    WO-2024206833 A1 * 10/2024

OTHER PUBLICATIONS

Barhydt et al., A High-Strength, Highly-Flexible Robotic Strap for Harnessing, Lifting, and Transferring Humans. IEEE Robot Automat Lett. Apr. 2023;8(4):2110-7.
Hirose et al., The development of soft gripper for the versatile robot hand. Mech Mach Theory. 1978;13(3):351-9.
Kurumaya et al., Design of thin Mckibben muscle and multifilament structure. Sens Actuators A Phys. Jul. 1, 2017;261:66-74.
Loh et al., Pneumatic Big-hand gripper with slip-in tip aimed for the transfer support of the human body. IEEE ICRA. May 2014:475-81.
McMahan et al., Field trials and testing of the OctArm continuum manipulator. IEEE ICRA. May 2006:2336-41.
Nguyen et al., Soft Poly-Limbs: Toward a New Paradigm of Mobile Manipulation for Daily Living Tasks. Soft Robot. Feb. 2019;6(1):38-53. doi: 10.1089/soro.2018.0065. Epub Oct. 10, 2018.

\* cited by examiner

*Primary Examiner* — Bobby Rushing, Jr.
(74) *Attorney, Agent, or Firm* — Wolf, Greenfield & Sacks, P.C.

(57) ABSTRACT

Disclosed herein is a flexible robotic limb. The design may include a backbone with rolling-contact joints connected to one another by pulley structures and corresponding cord loops engaged with the pulley structures. One or more flexible actuators may be used to control a length between adjacent links of the rolling contact joints to control articulation of the flexible robotic limb while still permitting passive reconfiguration of the flexible robotic limb when it is not being actively articulated.

20 Claims, 8 Drawing Sheets

FLEXIBLE ROBOTIC LIMBS INCLUDING ROLLING CONTACT JOINTS

RELATED APPLICATIONS

This Application claims the benefit of priority under 35 U.S.C. § 119(e) of U.S. Provisional Application Ser. No. 63/497,751, filed Apr. 24, 2023, the disclosure of which is incorporated herein by reference in its entirety.

FIELD

Disclosed embodiments are related to flexible robotic limbs including rolling contact joints.

BACKGROUND

Gently holding, lifting, and transferring the entire human body with a robotic system remains a challenging problem, despite extensive research and development efforts. Humans are heavy, delicate, deformable, and vary widely in shape, size, and pose. Standard robotic manipulators and end effectors cannot achieve sufficiently gentle human interaction while applying the high forces needed to lift the body effectively, although many high impact tasks depend on this functionality. In eldercare and care of people with physical disabilities, lifting humans is a task regularly carried out by caregivers, which is both strenuous and fatiguing on their bodies. This task is also used during emergency medical response, search and rescue, occupational therapy, ergonomic support for manual labor, and so forth. The current standard practice in eldercare is for caregivers to manually attach a harness to the patient or wrap their body with straps to securely harness and lift them. Straps are used because they are practical for high-force human interaction. For example, straps can be wrapped around any human in nearly any harnessing configuration to distribute the high load over a large contact area. This is enabled primarily by their high tensile strength and bending flexibility. However, manual handling by a human is required to attach straps in the appropriate configurations, which is a major bottleneck preventing fully autonomous human lifting and transferring with robotic systems.

The only robots that have demonstrated safe lifting of a human's full body weight for transfer are the RIBA robots, a series of mobile robots with two 2-link arms and high torque motors and the Toyota Patient Transfer Assist robot, a mobile robot with a shifting weight supporting platform that patients lie on. However, these works do not address the secure harnessing problem. In addition to the above, soft robots have been shown to be advantageous for safe and versatile human interaction due to the compliance of their structures. The big-hand gripper, a human scale pneumatic gripper, has demonstrated safe grasping of a human and assistance of a sit-to-stand transition. However, it has not demonstrated the ability to lift the full weight of a human and has only demonstrated assisted lifting with the load fully supported by its metal frame, concentrated entirely onto small contact areas under the subject's armpits. Vine robots are the closest example to an existing "strap-like" robot given their lightweight, compact, flexible, highly-extendable, and steerable bodies.

SUMMARY

Disclosed herein is a robotic limb. The robotic limb is comprised of a plurality of serially arranged rolling contact joints, and at least one flexible actuator attached to the plurality of serially arranged rolling contact joints at a plurality of connections serially arranged along the length of the actuator, wherein the flexible actuator is configured to control a length between the plurality of connections. Each rolling contact joint includes: a pair of adjacent links, and wherein each link of the pair of adjacent links includes a first set of pulley structures; at least one cord loop engaged with the first set of pulley structures of each link of the pair of adjacent links, and wherein the pair of adjacent links are configured to roll against one another; and at least one flexible actuator attached to the plurality of serially arranged rolling contact joints at a plurality of connections serially arranged along the length of the actuator, wherein the flexible actuator is configured to control a length between the plurality of connections.

Additionally, a method for operating the robotic limb is disclosed. The method includes actuating at least one flexible actuator attached to a plurality of serially arranged rolling contact joints at a plurality of connections serially arranged along the length of the actuator, wherein the flexible actuator is configured to control a length between the plurality of connections and pivoting the plurality of serially arranged rolling contact joints.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
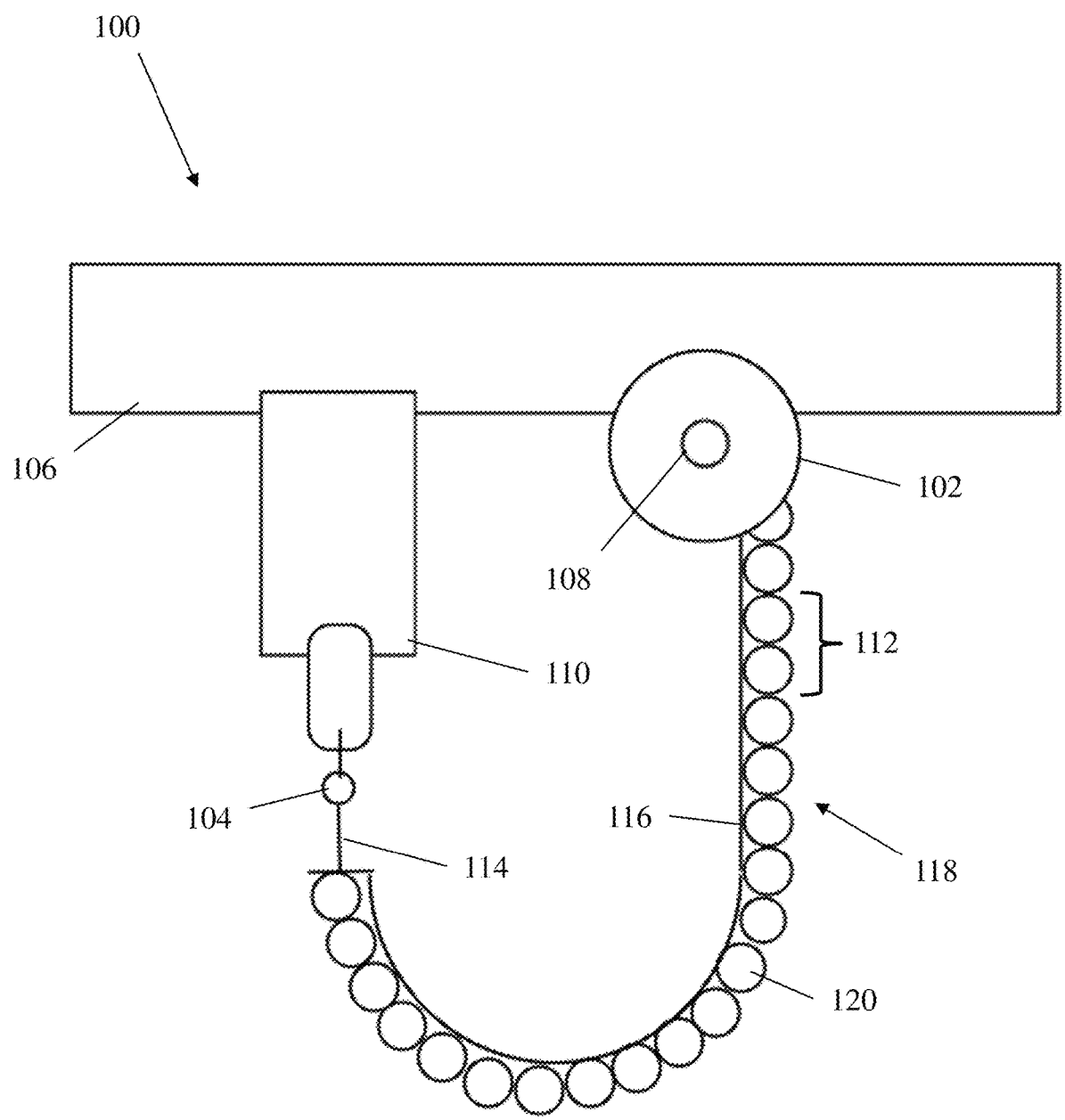
FIG. 1 is a schematic view of a flexible robotic limb according to one embodiment.

Safely harnessing and lifting humans for transfer is a challenging unsolved problem for current robots because of the high forces and gentle interaction necessary to do so. Specifically, the inventors have recognized that traditional robotic limbs are strong but are rigid and unable to conform to the structure of the item the arm is attempting to lift. This reduces the number of contact points between the robotic limb and an object being manipulated which results in larger forces being applied to the lifted item. Additionally, traditional robotic limbs may be rigid and difficult to bend. Straps, however, are highly beneficial for manually performing this task primarily because of their high tensile strength and high compliant bending flexibility. Specifically, straps and flexible vine robots can wrap around an object and passively distribute the force over a larger surface area. However, the Inventors have recognized that straps are manually manipulated, and vine robots and other typical flexible robotic limbs do not exhibit sufficient rigidity to manipulate larger loads.

In view of the above, the inventors have recognized a need for a flexible robotic limb which has the lifting strength of a traditional robotic limb while still being capable of conforming to a shape of an object to distribute loads and provide gentle manipulation of an object similar to a strap. In some embodiments, a flexible robotic limb may be configured to articulate itself when active and maintain a passive strap-like behavior when idle (i.e., not actively actuated). Such flexible robotic limbs may exhibit high tensile strength and high bending flexibility. For example, a flexible robotic limb may exhibit sufficient tensile strength to support an expected load such as the full weight of an average adult or other appropriate load. Such a flexible robotic limb may also exhibit a desired amount of bending flexibility in at least one direction that is sufficient to permit the flexible robotic limb to conform to a size and shape of an object, such as a person's body, which may help distribute the load along a length of the robotic limb engaged with the object which may help to minimize the applied pressure and has a large enough passive configuration space to enable significantly varied harnessing configurations for objects and/or people of different shapes, sizes, and poses.

In view of the above, the Inventors have recognized the benefits associated with a flexible robotic limb including a backbone. For example, a flexible robotic limb may include a backbone including a plurality of rolling-contact joints instead of traditional links with rotatable pin joints. In some such embodiments, serially arranged rolling-contact joints may be rotatably coupled to one another using appropriate connections to form a desired planar serial-chain backbone with little to no bending stiffness in a desired direction. The individual links of the flexible backbone may also exhibit rounded geometries which may exhibit larger contact areas with a human or other object being manipulated as compared to the pronged surfaces of more typical rigid robotic limbs.

In one embodiment, a flexible robotic limb including rolling contact joints may correspond to a plurality of serially arranged links where each link may form a portion of either one or two adjacent rolling contact joints depending on a location of a link along a length of the limb. For example, pairs of adjacent links may form each rolling contact joint and a link disposed between two opposing links may form separate rolling contact joints with the two separate links located on opposing sides of the intermediate link. To prevent the separate links from coming out of engagement with one another, each rolling contact joint may include at least one cord loop that is engaged with a first set of pulley structures of the adjacent links of the rolling contact joint to bias the links of the rolling contact joint together during operation. In some instances, a flexible robotic limb may also include one or more actuators that are attached to the plurality of serially arranged links at a plurality of connections along the length of the actuator. For example, the one or more actuators may be fixedly attached to separate links of the rolling contact joints along a length of the one or more actuators to control a length of the actuator between the links the one or more actuators are attached to as elaborated on further below. Without wishing to be bound by theory, the above noted flexible robotic limb may be capable of passively harnessing and lifting an object, such as a human, in a manner similar to a strap while also being capable of being actively articulated around the load to be manipulated. Thus, such a structure may be characterized by the high tensile strength and bending flexibility of straps in some embodiments.

In some embodiments, rolling contact joints may be defined by two adjacent links including corresponding curved portions that are configured to be in contact with and roll against one another to permit rotation of the joint. The rolling contact joint may also include at least one set of pulley and cord loop arrangements between the adjacent links of the backbone to maintain them in contact with each other via an applied force that includes an axial force component directed along an axial length of the flexible robotic limb to maintain the individual links in contact with the adjacent links of the backbone. This prevents separation of adjacent links while still allowing for a chain of these joints to be rotatable relative to each other with a flexibility similar to that of a strap. The rolling contact joints have the ability to rotate such that the flexible robotic limb is able to bend at large angles with little to no resistance. The angles which the flexible robotic limb are able to bend at can be controlled by the diameter of the links.

It should be understood that the various embodiments of a flexible robotic limb may include any appropriate type and/or number of actuators which may extend along an entire length or portion of a length of the flexible robotic limb. To help permit flexion of a flexible robotic limb in a passive state (i.e. when the actuators are not being actuated), in some embodiments the various actuators disclosed herein may be flexible actuators capable of being deformed with the flexible robotic limb. In some embodiments, the one or more actuators may be configured to control a length between sequentially located links of the backbone that the actuator is fixedly attached to. For example, the one or more actuators may be configured to set a length between sequentially connected portions of an actuator and the links the actuator are attached to and may resist extension and compression from a set length of the actuator. In some such embodiments, appropriate types of actuators may include, but are not limited to, pneumatic and/or hydraulic bladders (e.g., McKibben artificial muscles), shape memory actuators, Kirigami actuators, electroactive polymer actuators, and/or any other appropriate actuator capable of controlling a length between portions of adjacent links attached to the actuator.

As noted above, a flexible robotic limb may be used to assist in moving patients. However, the disclosed flexible robotic limbs may be used for any appropriate application. This includes lifting other heavy fragile objects in a more industrial setting. Additionally, as the disclosed flexible robotic limbs are capable of being articulated to move and steer in 3D space, they may be used for a large variety of handling and/or transferring of objects. For instance, the disclosed flexible robotic limbs may be controlled to move in three-dimensional space to move under and/or around a person or other load. Such a flexible robotic limb may be mounted on a ceiling, wall, other elevated location, and/or on any appropriate supporting surface or structure.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 illustrates the overall structure of a robotic system 100. A supporting surface 106 can be seen as the surface where a feeding drum 102 is mounted. The supporting surface may be a ceiling, wall, frame, floor, and/or any other physical structure capable of supporting the system 100. The feeding drum 102, which may be part of the robotic limb in some embodiments, may be configured to hold unused portions of the flexible robotic limb 118 wound therein. The feeding drum 102 may hold the unused portions in a coil, stack, or any other configuration to effectively store the robotic limb. A motor 108 or other appropriate drive may be used to rotate the drum to mechanically winding or unwind the flexible robotic limb 118 from within the drum though other feed systems may also be used to control extension and retraction of the flexible robotic limb 118. The flexible robotic limb 118 is in an articulated configuration where one or more actuators 116 have been used to articulate the serially arranged rolling contact joints 112 into a desired articulated configuration. At the end of the flexible robotic limb 118 is an end effector 114 that is attached to or extends out from a distal end portion of the flexible robotic limb 118. The end effector 114 may be configured to be engaged with, or may form a portion of, a connection 104 such that the flexible robotic limb may be attached to the lock 104. Appropriate structures for the connection may include corresponding grippers and structures to be gripped, interlocking mechanical features, latches, mechanically interlocking features, and/or any other appropriate type of connection. Alternatively, the end effector may be a sensor, a camera, and/or any other end effector needed for a desired use. In the depicted embodiment, the connection 104 attaches the flexible robotic limb to a separate actuator 110 capable of applying a force to the overall flexible robotic limb 118. For example, a linear actuator (e.g., pneumatic, hydraulic, or electric) may be used to move the attached portion of the flexible robotic limb 118 in a desired direction while under load.

While a single robotic limb is depicted in the figures and describe above, it should be understood that a system may include a plurality of flexible robotic limbs configured to lift or otherwise manipulate an object such as a person. The separate flexible robotic limbs 118 may be associated with separate feed drums 102 and other associated structures. After the flexible robotic limb 118 has been used to manipulate a desired load, the flexible robotic limb 118 may be disconnected from the connection 104 and withdrawn into the feeding drum 102.

It should be understood that the above noted flexible robotic limb may be design to exhibit any appropriate combination of design parameters including a desired length, tensile strength, and shear strength for manipulating an expected load. As mentioned above, the disclosed flexible robotic limbs may help enable the safe and gentle manipulation of objects including humans. However, it should be understood that the disclosed flexible robotic limbs may be designed and used for any desired application as the disclosure is not so limited.

Figure 2A:
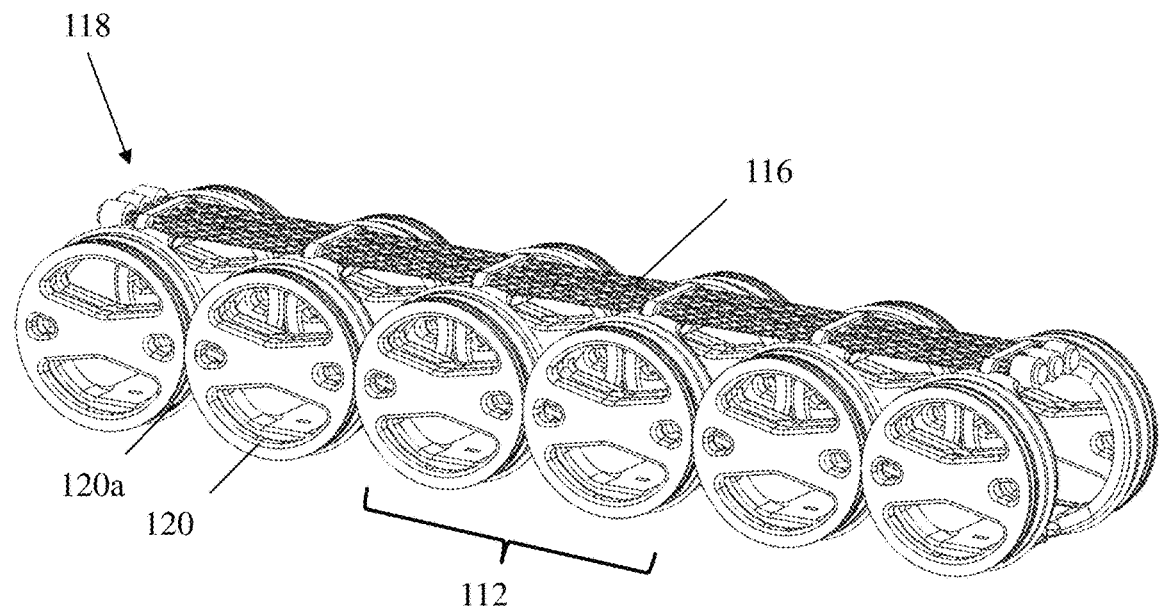
FIG. 2A shows a perspective view of a flexible robotic limb according to one embodiment.
Figure 2B:
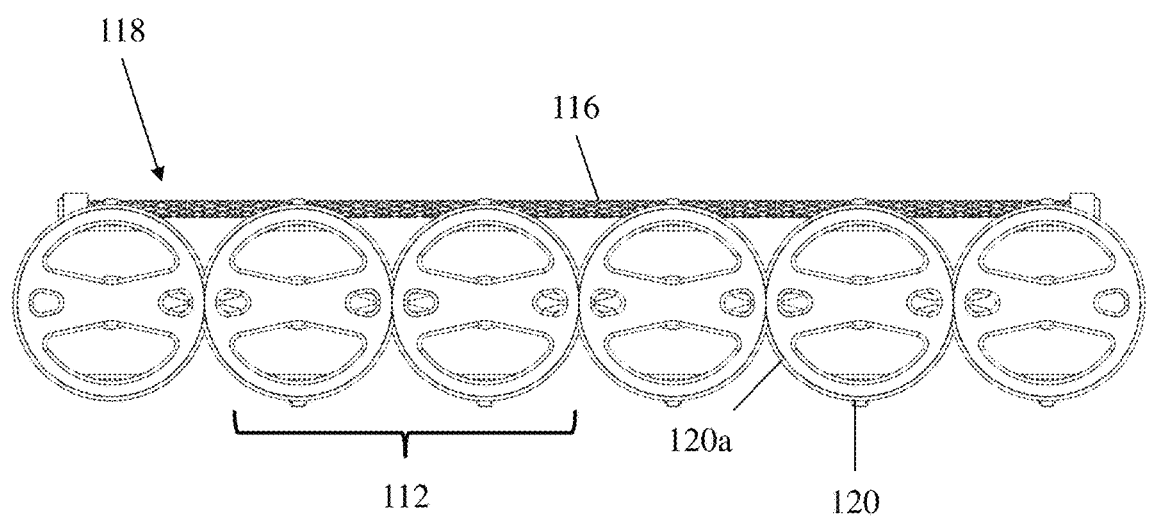
FIG. 2B shows a side view of the robotic limb of FIG. 2A.
Figure 2C:
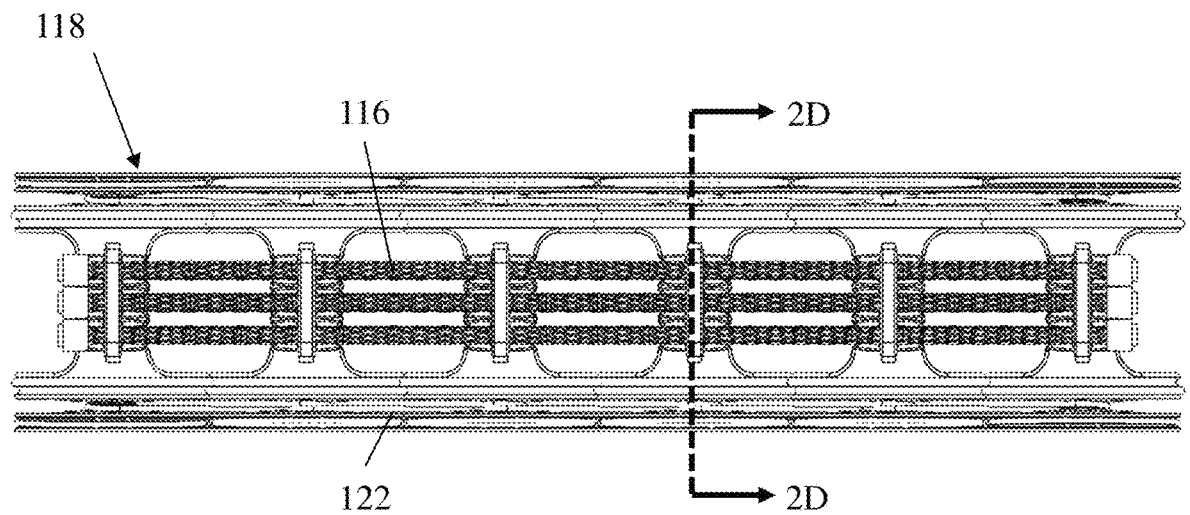
FIG. 2C shows a top view of the robotic limb.

FIGS. 2A and 2B show a portion of a flexible robotic limb 118 including a plurality of serially connected links 120 which form the flexible robotic limb. The links 120 include curved surfaces 120a that are configured to be positioned on and roll against corresponding curved surfaces of the adjacent links to form a plurality of serially arranged and connected rolling contact joints 112. In the depicted embodiment, these curved surfaces 112a have circular shapes. However, semi-circles, ovular, and/or any other appropriately sized and shaped curved surface that permits the links to roll against one another may be used. Additionally, in some embodiments, the links 120 may be cylindrical links. In either case, this allows for low friction rolling between links which in turn results in the entire structure being cable of bending in a direction that is parallel to the direction of the rolling contact between the adjacent links. This permits the flexible robotic limb to exhibit a desired axial rigidity and flexibility. In one embodiment of the robotic system disclosed herein, the links 120 may including opposing pairs of contact surfaces 120a located on opposing sides of a longitudinal axis of the flexible robot limb and one or more through holes, channels, or other openings may extend through the individual links which may help reduce the weight of the flexible robotic limb. For example, a channel 124, see FIG. 2D, may extend longitudinally through each link such that the sequentially arranged and aligned channels 124 located in each may form an overall channel extending through the flexible robotic limb 118.

To permit articulation of the flexible robotic limb, one or more flexible actuators 116 may be attached to one or more links 120 along a length of the associated actuator. In the depicted embodiment, a flexible actuator 116 is attached to and extends along a surface of the flexible robotic limb that is perpendicular to an axis of rotation of the rolling contact joints 112. The flexible actuator is offset from a neutral bending axis of the flexible robotic limb 118 such that it may apply a desired bending moment about the associated rolling contact joints 112 to cause the flexible robotic limb 118 to articulate to a desired configuration. Of course in some embodiments, a plurality of flexible actuators 116 extending along a length of the flexible robotic limb 118 may be used. For example, two flexible actuators 116 disposed on opposing sides of the flexible robotic limb 118 may be used. Additionally, in some embodiments, each flexible actuator 116 may be fixedly attached along its length to a plurality of links 120, and in some instances each link along a length of the associated actuator. Any appropriate connection that may prevent relative axial movement between the attached portion of a link 120 and the associated attached portion of the flexible actuator 116 may be used including, but not limited to, clamps, threaded fasteners, adhesives, mechanically interlocking features, and/or any other appropriate type of connection. Accordingly, flexible actuators configured to control a length between adjacent attached portions of the sequentially located links may be used to articulate the flexible robotic limb during actuation while still permitting passive movement of the flexible robotic limb when the actuators are not powered.

In the depicted embodiment, a McKibben actuators is depicted which is a type of pneumatic artificial muscle with an inflatable inner tubing and an outer fiber mesh that contracts its length as its volume expands and may be characterized by its high force-to-weight ratios. Thin McKibben actuators are characterized by their small diameter and resulting high bending flexibility while maintaining high force and contraction performance. Their light weight also allows them to be mounted directly onto the backbone without weighing it down significantly, which contributes to addressing the technical challenges. However, it should be understood that different types and arrangements of an actuator as disclosed herein may also be used.

While it is desired for the flexible robotic limb 118 to be flexible in a desired bending direction perpendicular to the contact surfaces between the individual links of the rolling contact joints, other types of movements such as longitudinal, transverse shear, and rotational twisting movements may result in a loss of contact between adjacent links 120 of the rolling contact joints 112. Accordingly, various retaining features may be used to maintain the individual links in contact with one another. As elaborated on below, these features may include one or more cord loops extending between and connecting one or more corresponding pulley structures of the adjacent links 120 and one or more optional interlocking features. It should be understood that a cord loop may consist of any material that is flexible and capable of being engaged with the separate links of the rolling contact joints while permitting rotation. This may include but is not limited to belts, cords, cables, chains, and/or any other appropriate flexible materials.

Figure 2D:
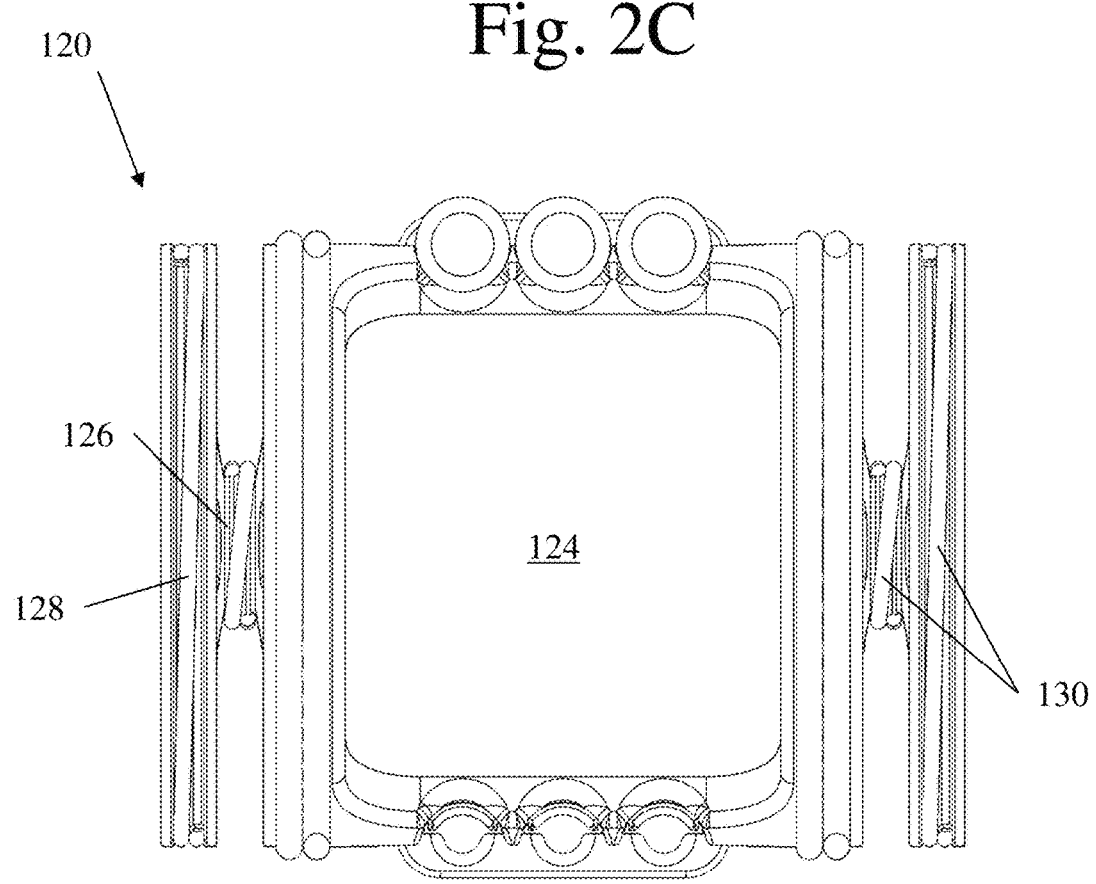
FIG. 2D shows a cross section view of the robotic limb.

FIG. 2D is a cross sectional view of the flexible robotic limb 118 showing a front view of an individual link 120. The link 120 includes one or more first pulley structures 126 and one or more second pulley structure 128. In some embodiments, the first and second pulley structures 126 and 128 may include axes of rotation that are aligned with one another for an individual link. In the depicted embodiment, the first pulley structure 126 may extend out from a body of the link and may have a first maximum transverse dimension (e.g., a first radius) that is perpendicular to an axis of rotation of the pulley structure. The second pulley structure 128 may be connected to and extend out from the first pulley structure 126 in a direction away from the body of the link. The second pulley structure 128 may have a second maximum transverse dimension (e.g., a second radius) that is larger than the first transverse dimension. The benefits associated with this arrangement are elaborated on further below. The first and second pulley structures 126 and 128 may include aligned axes of rotation. Additionally, in some embodiments, the first and second pulley structures 126 and 128 may correspond to two first and second pulley structures 126 and 128 disposed on and extending outwards from opposing sides of a longitudinal axis of the individual links 120 and overall flexible robotic limb 118. Each of the separate pulley structures may be engaged with separate sets of cord loops for maintaining adjacent links 120 along the length of the flexible robotic limb 118 in contact with one another.

In the depicted embodiment, the pulley structures 126 and 128 correspond to separate pairs of curved slots extending at least partially, and in some instances completely around a perimeter of the associated pulley structure and are configured to be engaged with a corresponding cord loop. The slots may be straight slots, or they may be angled overlapping slots as illustrated in the figure. In either case, the two slots included on each pulley structure 126 and 128 may function as two separate pulleys for being engaged with two separate cord loops 130 for attaching a link 120 to two separate opposing links 120 disposed on either side of the link 120 along a length of the robotic limb. Of course, while slots have been illustrated, it should be understood that any appropriate structure capable of engaging and retaining a cord loop may be used, including but not limited to curve flats with belts, and/or any other appropriate configuration. Regardless, when the individual links 120 are rotated relative to one another, the cord loops may be engaged with and move in response to movement of the pulley structures of adjacent links to maintain the links in contact and in a desired configuration relative to one another.

Figure 3A:
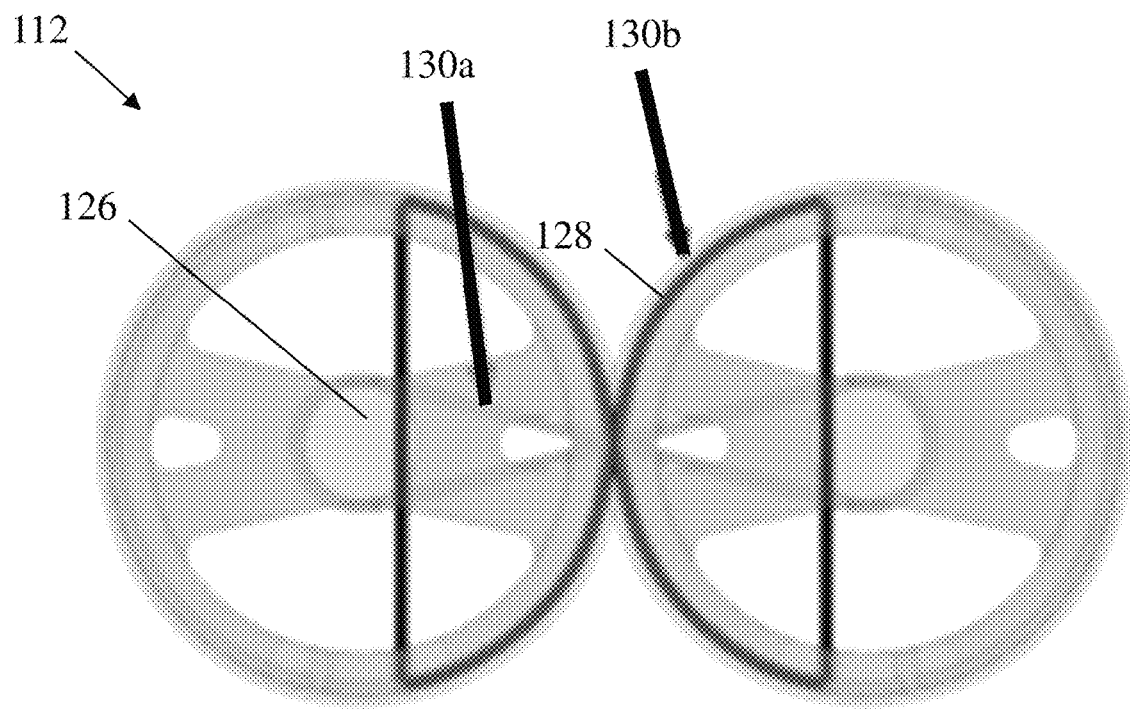
FIG. 3A illustrates the cord loops, pulley structure, and interlocking mechanical features of a rolling contact joint of a flexible robotic limb according to one embodiment.

The dual-pulley fastening mechanism including two sets of inner and outer pulleys (i.e., the first and second pulley structures 126 and 128) is further illustrated in FIG. 3A which shows an isolated rolling contact joint 112 which may form a portion of any one of the embodiments of a flexible robotic limb disclosed herein. The inner 130a and outer 130b pulley cord loops fit into slots in the pulley structures which allow for the cords to resist overlapping. This may help prevent accelerated degradation due to the cords contacting each other. The inner-pulley cord 130 is engaged with the smaller dimension inner pulley 126. Thus, tension in the inner cord loop 130a may resisting the joints from being pulled apart in the axial direction. This is due to the forces exerted by the pulley cords engaged with the inner pulley structures being more aligning with the longitudinal axis of the flexible robotic limb (i.e., forming smaller angles than the outer cord loops). The two inner-pulleys sets are also located near the opposite ends of the joints, and thus may help constrain the joints from bending about an axis orthogonal to the desired bending and tensile axes.

As noted above, the second pulley structure 128, or outer pulley, has a larger transverse dimension (e.g., radius) than the first pulley structure 126. This may align a force of the outer cord loops 130b engaged with the second larger pulley structures to be oriented in a direction that is more angled relative to the longitudinal axis of the flexible robotic limb than the inner cord loops 130a. This may be beneficial as restraining forces oriented in this direction may help to resist shearing forces oriented transverse to the longitudinal axis and twisting forces oriented along the longitudinal axis. Additionally, while in some embodiments, the second outer cord loops 130b may extend completely around a circular pulley structure, in the depicted embodiment, the second set of pulley structures 128 may includes a curved portion and a straight portion that are engaged with the second cord loop 130b.

Figure 3B:
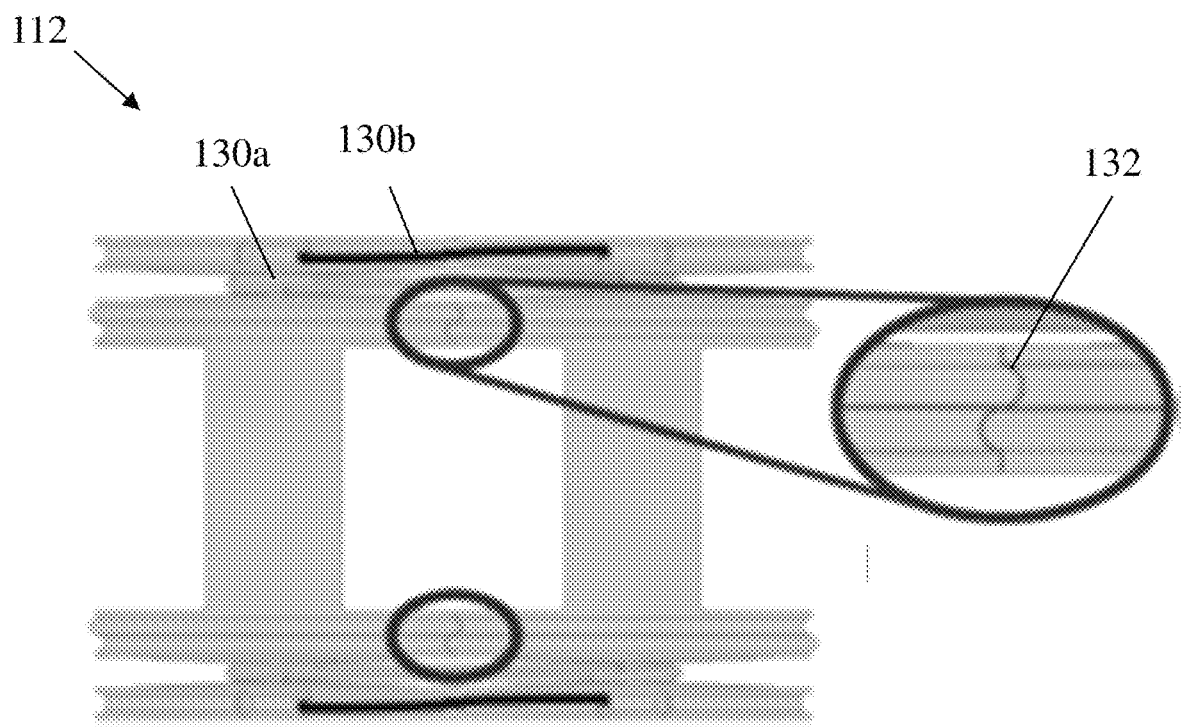
FIG. 3B is a top view of the rolling contact joint of FIG. 3A.

In addition to the use of cord loops above, it may be desirable to include one or more mechanical features to resist shearing apart of the individual links during operation. For example, a rolling contact surface between two adjacent links 120 may include one or more overlapping mechanical features that may be configured to resist shearing forces applied in a direction out of the bending plane of the flexible robotic limb. For example, interlocking grooves 132 shown in FIG. 3B are held engaged with one another by the tensile force applied by of the inner-pulley cords 130a and resist relative movement of adjacent links in a direction that is out of the bending plane. The interlocking features 132 provides a tertiary strengthening feature that is perpendicular to the plane formed by the cords. Of course, while interlocking grooves have been illustrated in the figure, it should be understood that any appropriate type of configuration including rail and groove and/or other appropriate rolling contacts including interlocking mechanical features configured to resist relative movement of the pair of adjacent links in a direction out of a bending plane of the limb may be used.

The above disclosed dual-pulley links with corresponding engaged cord loops enables the use of rolling-joints in a backbone design while maintaining the desired tensile strength and achieving the out-of-plane deflection resistance that is beneficial for fully-determined active bending capabilities. The cords may be assumed to have a high tensile strength and negligible bending stiffness in some embodiments. Combined with the interlocking grooves or other mechanical interlocking features between the joints, this design may offer minimal bending resistance between joints in the desired two dimensional bending plane while rigidly constraining all other translational and rotational degrees of freedom of the limb. Although all of these features may be beneficial, it should be understood that a flexible robotic limb including links with a single set of pulley structures and corresponding cord loops for attaching adjacent links may be used as the disclosure is not so limited.

Example: Potential Joint Design

Figure 4A:
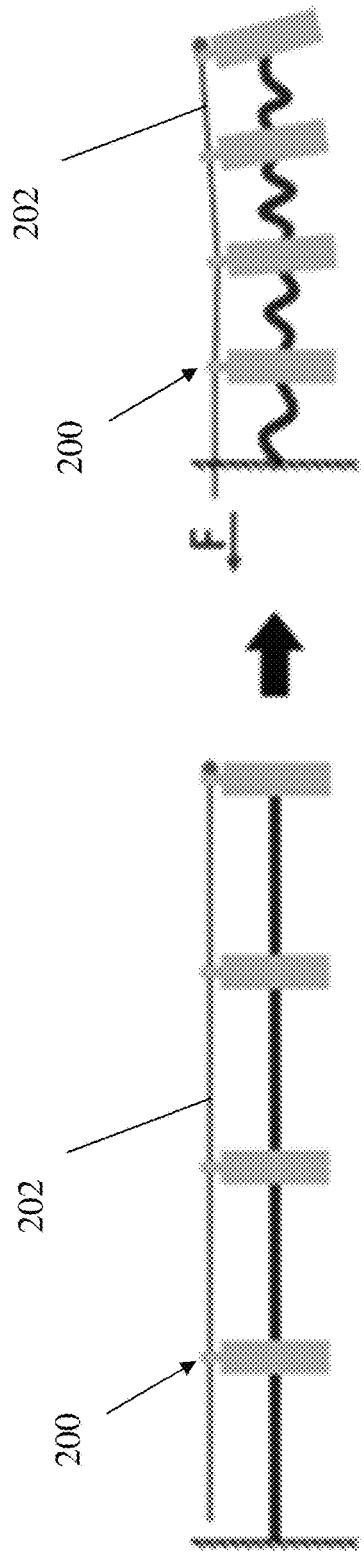
FIG. 4A illustrates an exemplary robotic limb constructions and corresponding reaction to an applied compressive force.

Different flexible robotic limb designs were evaluated based on different set of functional arrangements. Cable-drive mechanisms have been widely used in hyper-articulated and continuum manipulators. Cables transmit forces generated by actuators placed at a base to individual joints, offsetting the actuator masses from the manipulator's body. However, they create opposing tensile/compressive forces along the backbone, which affects its posture unless the tensile forces are supported by the backbone structure along the transmission line. Strap-like structures 200 have no bending stiffness, and thus will buckle under any compressive forces applied by a wire based transmission 202, as illustrated in FIG. 4A. Thus, the design framework may employ a serial chain backbone with discrete rigid joints, making it possible to bend the structure with compressive forces without buckling as long as the forces are applied only between directly adjacent links. This allows the backbone to simultaneously provide minimal passive bending resistance and a fully determined articulating structure.

Figure 4C:
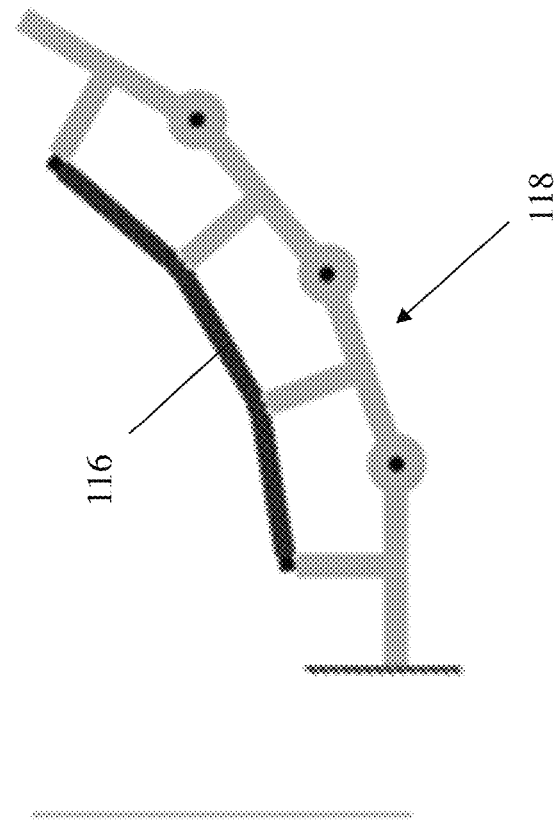
FIG. 4C illustrates a flexible robotic limb with a construction corresponding to the various embodiments disclosed herein and a corresponding reaction to an applied compressive force.
Figure 4B:
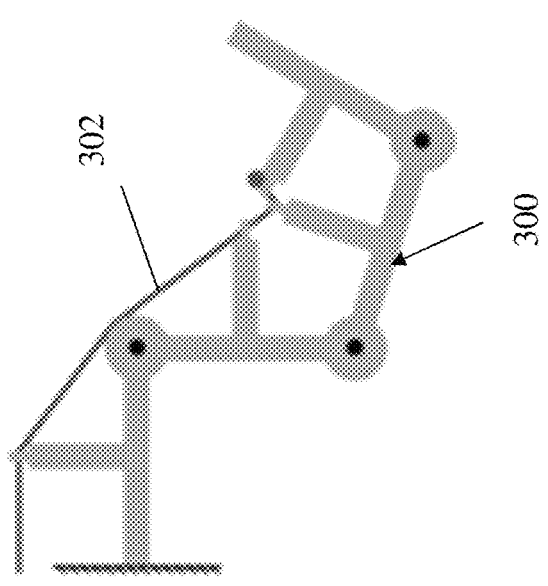
FIG. 4B illustrates an exemplary robotic limb constructions and corresponding reaction to an applied compressive force.

The second design factor that was isolated is between high bending flexibility and the common practice of designing specific bending stiffness behaviors into the backbone to statically determine its structure with relatively few actuators. Without this stiffness, force applied at a few points along a flexible backbone 300 by an actuator 302 would not distribute over the rest of the backbone, causing it to collapse as illustrated in FIG. 4B. Thus, separate transmissions would need to directly actuate every actuator, limiting the feasible passive bending resolution. To address this, in some embodiment, each actuator/transmission 116 may directly attach to and simultaneously bend every point along corresponding backbone segment of the flexible robotic limb 118. This may be accomplished by the uniformly contracting artificial muscles embedded along the backbone, as illustrated in FIG. 4C. The single actuator determines the bending angle of every joint it is attached to, and thus the number of passive bending actuators can theoretically be infinitely scaled up without increasing the number of required actuators. This allowed the design to provide high bending flexibility in terms of both the minimal bending stiffness and high passive bending resolution, while remaining fully determined without needing to directly actuate each passive actuator individually.

Example: Tensile Strength

The tensile strength of the flexible robotic limb was measured as the maximum tensile load it can hold. The dual-pulley fastening mechanism is illustrated in FIG. 3A, where α is the angle between the cords and the neutral line, and $R_{ip}$ and R denote the inner pulley and joint radii, respectively. Sin $\alpha=R_{ip}/R$. The joints are assumed to be rigid, and changes in the tensile strength of the cord due to bends and knots are assumed negligible. The tensile strength of the dual-pulley fastening mechanism $T_{max}$ is given by $$T_{max} = 2N_{pulley}T_{max,cord}\frac{\sqrt{R^2 - R_{ip}^2}}{R} \quad (1)$$

where $N_{pulley}=2$ is the number of inner pulleys per single joint, and $T_{max,cord}$ is the tensile load capacity of cord.

Example: Passive Bending Resolution, Curvature, and Resistance

Three metrics to quantify bending flexibility performance were evaluated including: passive bending resolution, curvature (i.e., range of motion), and resistance. The passive bending resolution was defined as the number of passive bending actuators within a unit length of the backbone, given as $$\zeta = (2R)^{-1} \quad (2)$$

For large joint diameters, the resolution is low, and the robotic limb not conform to small and complex geometric surface features. For small joint diameters, the resolution is high, and the strap can closely conform to small and complex geometric surface features, increase the contact area, and distribute force more uniformly.

The maximum passive bending curvature may also be used for characterizing bending flexibility because it determines how small and complex of surface features the structure can conform to. The bending kinematics of the flexible robotic limb and a pair of fastened joints with an idle artificial muscle, where l is the actuator length, $R_C$ is the radius of curvature, θ is the angle a joint bends away from the neutral line AB (angle between joint frames is 2θ), and κ is the curvature. The actuator length l is kinematically dependent on θ given as $$l = 2R(1 - \sin\theta) \quad (3)$$

The actuator contraction ratio defined below was then related to the joint angle as $\varepsilon=(l_0-l)/l_0=\sin\theta$. Hypothetical triangles CAB and CDE are similar. Therefore, $$\frac{1}{2R} = \frac{R_c - R}{R_c} \quad (4)$$

Solving this for $R_C$ we can find the curvature $\kappa$ as $$\kappa = \frac{1}{R_c} = \frac{\sin\theta}{R} = \frac{\varepsilon}{R} \quad (5)$$

Thus, for contraction actuators ($0 < l \leq 2R$), $\kappa=0$ when $\varepsilon=0$ ($l=2R$) and $\kappa=R^{-1}$ when $\varepsilon=1$ ($l=0$). Given the minimum idle actuator compressed length $l_{min,p}$, the maximum curvature can be defined as $$\kappa_{max} = \frac{2R - l_{min,p}}{2R^2} = \frac{\varepsilon_{max,p}}{R} \quad (6)$$

The design parameters relevant to the maximum passive bending curvature are therefore R and $l_{min,p}$. Given that idle McKibben actuators buckle and fold when compressed, lmin,p can be assumed to be roughly equal to the thickness of two flattened actuators pressed against each other, approximated as $l_{min,p} \approx 2(2(t_{tubing}+t_{mesh}))$ where t denotes wall thickness.

Figure 5A:
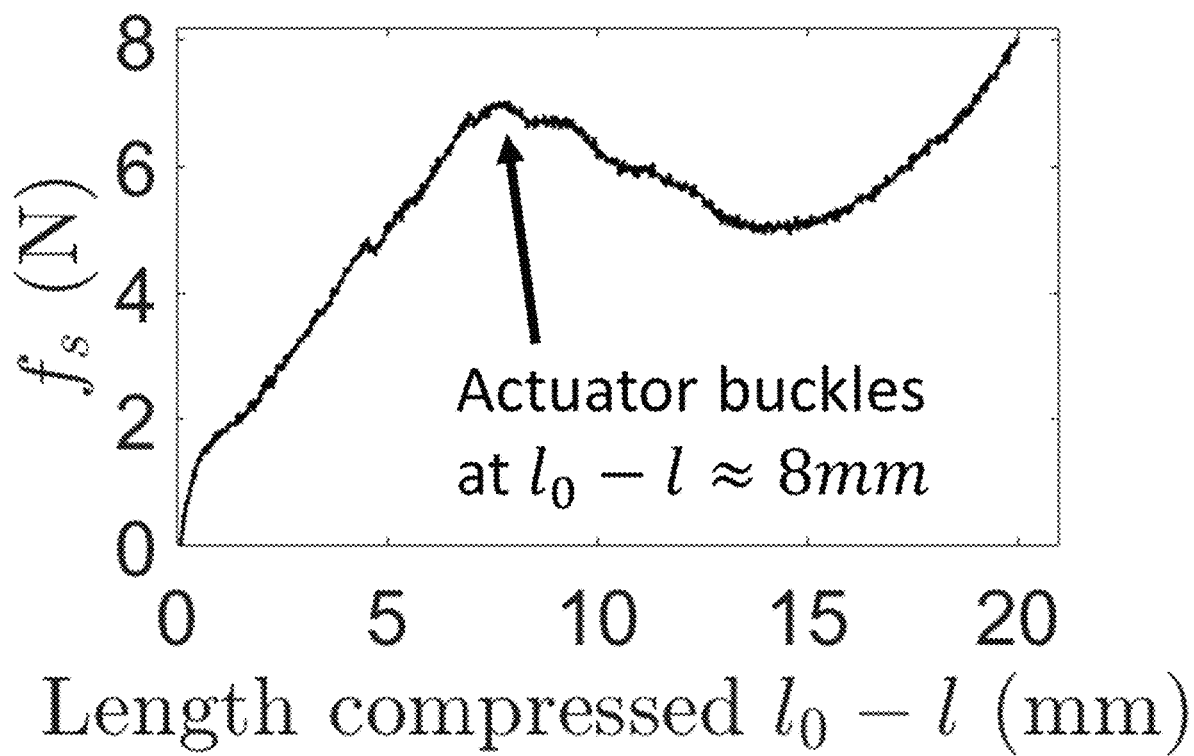
FIG. 5A is a graph of actuator compression length versus reaction force of a passive (i.e., not actively actuated) actuator when being compressed to a corresponding length.

The passive bending resistance is the reaction moment exerted by a joint with idle actuators when bent. The flexible robotic limb is designed to compliantly bend under sufficiently low applied moments in order to conform to the body without generating high reaction forces that can concentrate the load around high curvature surface features. Idle thin McKibben muscles easily buckle under low compression forces, and thus they are completely backdriveable and minimally contribute to bending resistance. This relationship can be seen in FIG. 5A. It can be seen that the force starts to decrease around when the inner tube begins to buckle, and increases again as the outer mesh becomes more compressed. A diagram relating the joint bending moment Mb to the actuator compressive reaction force can be derived as $$M_b = N_a f_s(l) r_m = N_a f_s(l) R \cos(\theta) \quad (7)$$

where $N_a$ is the number of actuators embedded along the back-bone in parallel, and $f_s(l)$ is an experimentally determined function relating the actuator's compressive reaction force to its length. Since different actuator mount designs may apply different bending moments to the actuators as the joints rotate, we assume that $f_s(l)$ describes an actuator in pure compression (moments applied by the mounts are negligible) to ensure that Eq. 7 provides a worst-case upper-bound estimate of $M_b$ for a given $\theta$. Note that l is a function of $\theta$ (Eq. 3), thus $f_s(l)$ is a function of $\theta$. Given this model, R, $f_s(l)$, and $N_a$ are the design parameters relevant to the passive bending resistance. It should be noted that, in Eq. 7, $M_b$ will change with respect to changes in all the parameters except for R, because physically altering R will also alter the experimentally determined force-compression curve $f_s(l)$. Therefore, while Eq. 7 implies that $M_b$ increases as R increases, the opposite can be concluded by modeling the actuator as a buckling column with fixed ends. The maximum compression force of a column is its buckling force, which is given by Euler's column formula, $f_{s,max}=F_{buckle}=4\pi 2EI/l_0^2$. Thus $M_{b,max} \propto N_a l_0^{-2} R = N_a (2R)^{-2} R = N_a R^{-1}/4$, and therefore $$M_{b,max} \propto R^{-1}. \quad (8)$$

The bending actuation parameter for providing a desired range of motion may defined as the maximum moment and angle the joints may achieve in order to reach the most demanding desired open-loop configurations. The flexible robotic limb is configured to be able to actively assume desired open-loop configurations that surround an object before latching its tip to close the loop and tighten itself around the body. It was assumed no external contacts/forces were utilized to achieve these configurations. There exists a simple vertical configuration for surrounding an object before harnessing and lifting, parameterized by the minimum number of geometric parameters (curvature radius $R_C$ and hanging length $L_h$) necessary to fully define the desired active range of motion in terms of the manipulator (curvature $\kappa=R_C^{-1}$ and full extended length from the base $L_{ext}=2L_h+\pi R_C$). For simplicity, the curvature of the bent segment was assumed to be constant. The moment applied onto the most proximal joint (joint 0) by the extended structure can be given by $$\sum_{i=1}^{N} M_i^0 = 2Rg \sum_{i=1}^{N}\left[m_i \sum_{j=1}^{i} \sin\left(\sum_{k=i}^{j} \theta_k\right)\right] \quad (9)$$

where $\theta_k$ is the bending angle between joint k and joint k−1, $M_i^0$ is the moment that joint i individually contributes to the total moment experienced by joint 0, $m_i$ is the mass of joint i (including the associated actuator segment length), and N is the total number of joints distal to joint 0 in the serial chain. Given the assumed constant curvature of the bending section, $\theta_k$ is also assumed constant for all k=1 ... $N_C$, where $N_C$ is the number of joints in the curved segment. Therefore, we define $\theta_k=\theta_C$ for all k=1 ... $N_C$ and $\theta_k=0$ for all for all k=$N_C$+1 ... N, and can express $\theta_C$ as $\sin\theta_C=2R/R_C$.

The moment that the curved segment exerts onto joint 0 is given in terms of the design and configuration parameters as $$\sum_{i=1}^{N_C} M_i^0 = 2Rg \sum_{i=1}^{N_C}\left[m_i \sum_{j=1}^{i} \sin\left(j \cdot \sin^{-1}\left(\frac{R}{R_c}\right)\right)\right] \quad (10)$$

The moment exerted by the straight cantilevered section can also be modeled as $$\sum_{i=N_C+1}^{N} M_i^0 = g \sum_{i=N_C+1}^{N}\left[m_i\left(y_{N_C}^0 + 2R(i - N_C)\right)\right] \quad (11)$$

where $$y^0_{N_C} = 2R \sum_{j=1}^{N_C} \sin(j \cdot \theta_C).$$

Therefore the total moment exerted on joint 0 by the extended structure in terms of only the design and configuration parameters is the sum of Eq.10 and Eq.11.

$$M^0 = \sum_{i=1}^{N} M_i^0 = \sum_{i=1}^{N_C} M_i^0 + \sum_{i=N_C+1}^{N} M_i^0. \quad (12)$$

If all joints are assumed to have the same mass (mi=m) and a uniform density along the length of the structure, then the moment can also be expressed analytically by modeling the mass distribution as a continuous beam with a constant cross section. The curved segment can be modeled as a quarter-ring and the straight section can be modeled as a horizontal beam of length $2(N-N'_C)R$ where $N_C \approx N'_C = \pi R_C/4R$. Thus, Eq.10 and Eq.11 can be modeled analytically and summed to yield the analytical equation for the total moment exerted onto joint 0 by the extended structure, given by $$M^0 = \left(\frac{\pi}{2} - 1\right)\frac{R_C}{\theta_c} mg + (N - N'_C)mg(R_C + R(1 + N - N'_C)). \quad (13)$$

Given the applied moment, the actuator force at the desired bending angle is given by $$F_a = \frac{1}{N_a} \frac{M^0}{R \cos \theta_C} \quad (14)$$

where Na is the number of actuators embedded in parallel along the backbone and $\theta_C$ is given in terms of R and $R_C$ as $\sin \theta_C = 2R/R_C$. To reach the desired ranges of motion, the actuators may generate sufficient forces to hold the most demanding configurations, and also may generate them at the contracted lengths l to achieve the bending angles of the desired configuration. The length l for a desired bending angle is given by Eq. 3. Given these models, the actuator force and contraction $F_{a,req}$ and $\varepsilon_{req}$ for a desired configuration are dependent on R, m, and $N_a$.

Example: Design Trade-Offs

These models reveal notable design trade-offs for achieving the desired performance relevant to the different metrics. Most involve the joint radius R, in that decreasing R increases the passive bending resolution $\zeta$ and the maximum passive curvature $\kappa_{max}$, but also decreases the tensile strength $T_{max}$, and increases the passive bending resistance Mb,max and actuator force $F_{a,req}$ for a desired maximum active bending curvature $\kappa_{req,a}$, as shown in Eqs. 2, 6, 1, 8, and 14 respectively. Notably, R acts as an effective "gear ratio" between $F_a$ and $\kappa_{req,a}$, in that it provides the mechanical advantage necessary to generate the bending motion. These trade-offs can be functionally summarized as: a larger radius is desirable for safely lifting heavy objects of varying size, and smaller radius is desirable for closely passively conforming to complex surfaces with high-curvature features. A trade-off also underlies the number of parallel actuators $N_a$, in that increasing $N_a$ decreases $F_{a,req}$ but also increases $M_{b,max}$. While increasing $N_a$ can also increase the corresponding width of the cylindrical joint to mount them all, which can increase the mass, the actuator design targets may still decrease as long as the additional actuators increase the active bending moment more than the added weight increases the opposing load.

Example: Experiments

A 1143 mm long, 0.419 kg manipulator prototype was developed to implement the flexible robotic limb design shown in FIG. 1. The backbone included 3D-printed joints fastened together with 0.97 mm thick Kevlar threads rated to hold up to 58.97 kg each. The joints were made of a carbon fiber filled nylon filament (some with continuous carbon fiber reinforcement). Each joint was 38.1 mm in diameter and 56.8 mm deep with an inner pulley radius of $R_{ip}$=4.35 mm. The manipulator included three independently actuated 10-joint segments, each with four thin McKibben actuators mounted in parallel. The actuators have an unloaded contraction ratio of ~22% and a stall force of ~20 N at 0.3 MPa. Their relatively low pressure and flow rate operation allow the manipulator to be actuated using a small pump module.

Figure 5B:
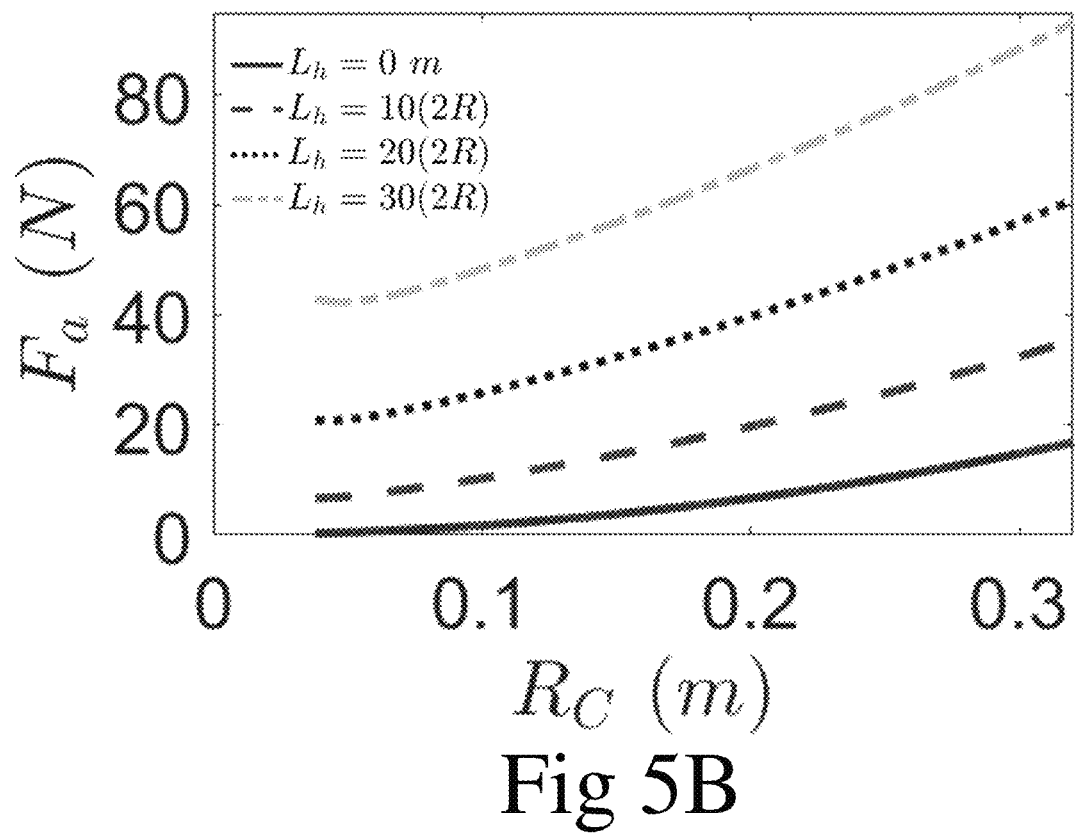
FIG. 5B is a graph of a relationship between actuator force of the system versus the radius of curvature of a limb during bending with the flexible robotic limb oriented in a downward orientation and wrapped around an object that is directly below the robotic limb.
Figure 5C:
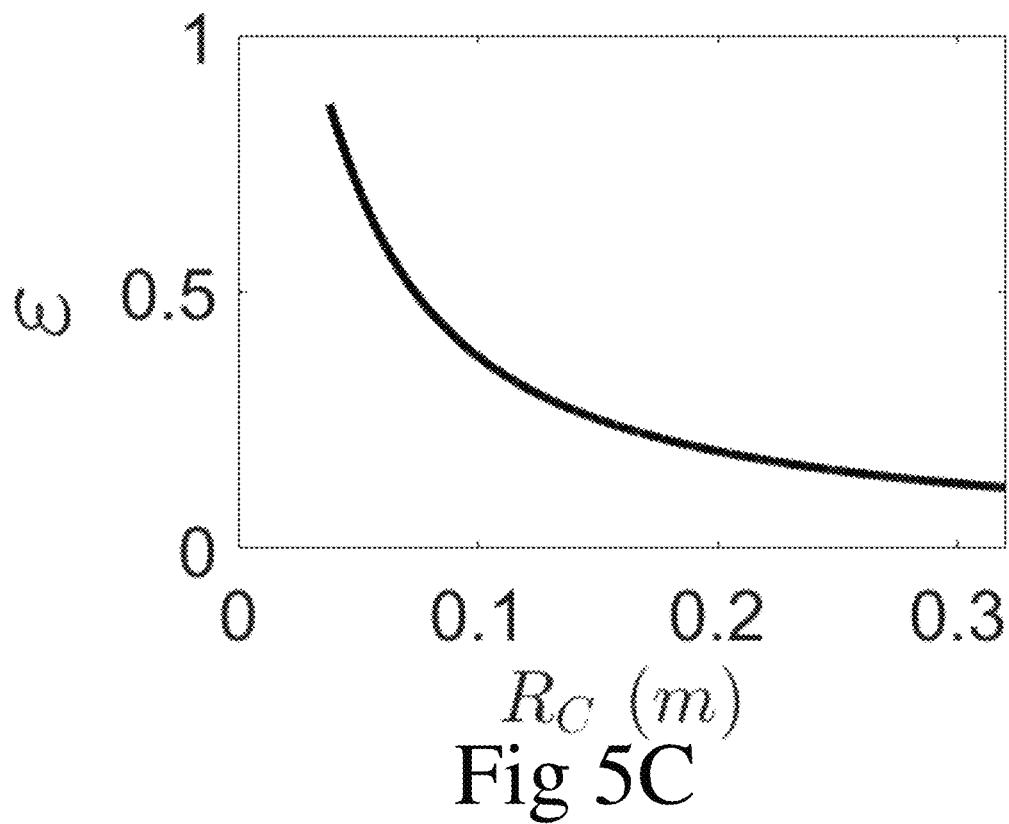
FIG. 5C is a graph of the contraction ratio of the actuators for the limb to achieve a certain radius of curvature comparing the actuator joint ratio to the radius of the curve.
Figure 6:
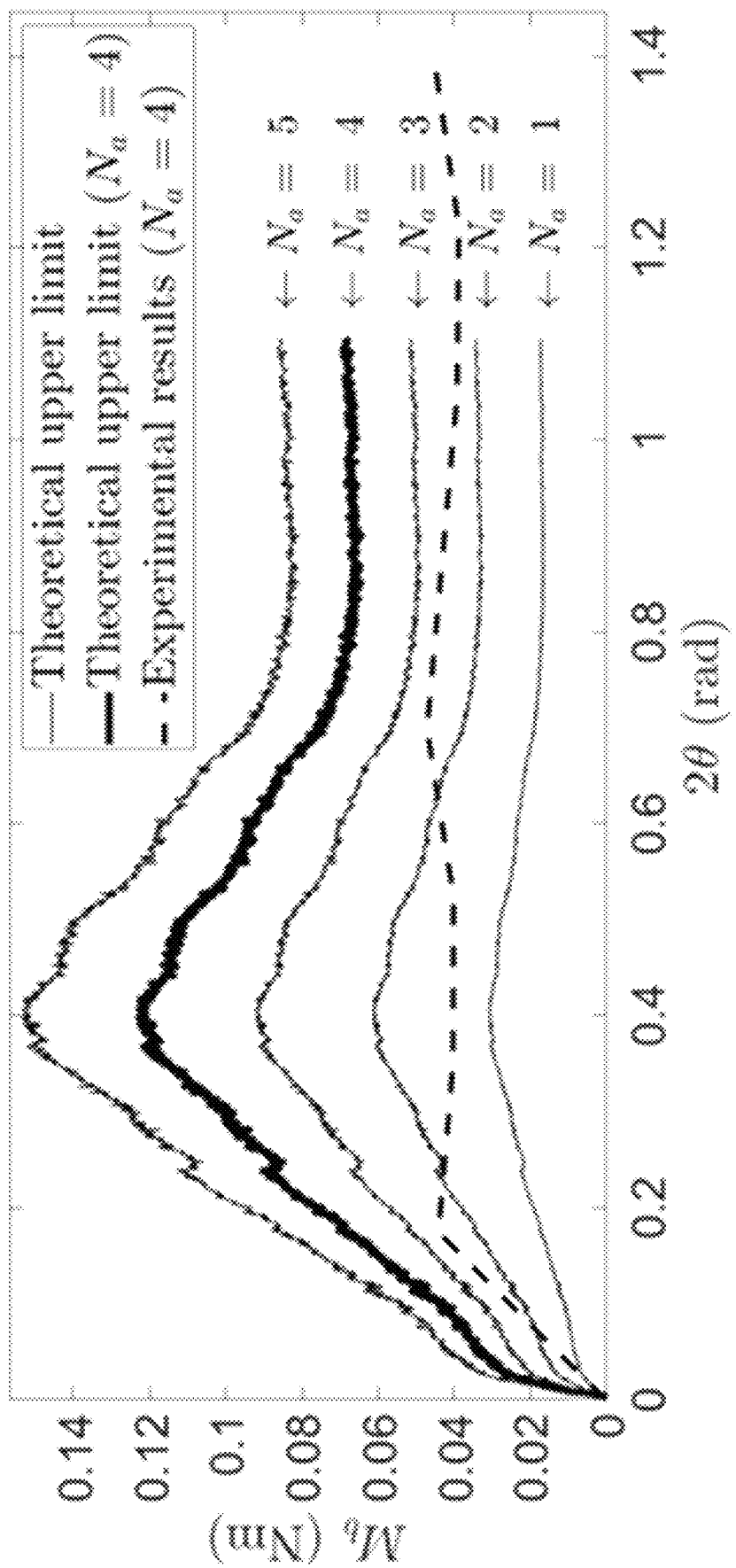
FIG. 6 is a graph of a relationship between passive bending resistance and the number of parallel actuators.

Given these specifications, the theoretical tensile strength is $T_{max}$=2255.3 N (Eq.1), and the passive bending resolution is $\zeta$=26.3 actuators/m (Eq.2). The theoretical maximum passive curvature is $\kappa_{max} \approx$47.5 rad/m (Eq.6) given an estimated compressed actuator length of $l_{min,p} \approx$3.6 mm. Given the passive actuator compression force-displacement function $f_s(l)$, the theoretical upper limits for passive bending reaction moments at given joint angles were calculated using Eq. 7, as shown in FIG. 6 ($M_{b,max}$=0.123 Nm at $\theta$=0.4 rad, $N_a$=4). The actuator design parameters $F_{a,req}$ and $\varepsilon_{req}$ were calculated for varying values of the desired configuration parameters $R_C$ and $L_h$ using Eqs. 14 and 3 (results shown in FIGS. 5B and 5C).

To validate the design in terms of its key characteristics, the tensile strength, passive bending flexibility, and active self-articulation capability were experimentally determined.

Tensile Strength: The tensile strength of the backbone was tested on an Instron 5969 tensile testing system. The sample withstood 1314.2 N (134.0 kg) before breaking, with the failure first occurring at the knot for one of the inner pulley thread loops. Since a strap in the closed-loop configuration splits the harnessed load between its two hanging sides in tension, this implies that a single flexible robotic limb can hold up to 2628.4 N (268.0 kg). The measured tensile strength is 58.3% of the modeled value, most likely due to reductions in the Kevlar cord's strength at the knots. Still, given that the average weight of adult males aged 20 and over in the United States is 90.6 kg (77.5 kg for females), these results well exceed the requirements for lifting the full weight of a human.

Passive Bending Flexibility: The passive bending flexibility was validated by experimentally measuring the passive bending resolution, curvature, and resistance. The passive bending resolution was directly measured to be $\zeta$=26.25 actuators/m, as expected. The maximum passive bending curvature and resistance were measured using an apparatus which measures the force at progressively increasing angles.

The maximum passive bending curvature was measured to be $\kappa_{max,p}$=42.01 rad/m ($R_{C,min}$=0.0238 m). This is close to the theoretical value, although slightly lower due to approximation error in $l_{min,p}$. Given this result, the minimum object diameter the flexible robotic limb can harness is $2R_{C,min}$=

2R=9.5 mm, which is reasonably smaller than any human body feature that would need to be conformed to.

The measured passive bending resistance results are shown in FIG. 6. These experimental results are lower than the modeled upper limit results for $N_a$=4 across their entire domain, as expected. This implies that the actuator mounts apply nonnegligible bending moments onto the actuators (unlike in the pure compression case described by $f_s(l)$ in Eq. 7), which aligns with the observations made during experimentation. Thus, the model provides a conservative estimate for the passive bending resistance.

Active self-articulation: To validate the actuator model, the flexible robotic limb was actuated as shown in FIG. 1 to test whether it achieved the expected curvature given the expected actuator force/contraction (determined from separate loading tests). Given an expected actuator performance of ε=0.855 under a 1 kg load at 0.3 MPa, the manipulator theoretically should achieve a configuration with a radius of curvature of at most $R_C$=0.246 m assuming a hanging length of $L_h$=0 m (based on Eqs. 3, 4, and 14). Thus, a curvature diameter smaller than 0.492 m is expected. An effective curvature diameter of ~0.40 m was achieved, which satisfies the expected results.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A robotic limb comprising:
    a plurality of serially arranged rolling contact joints, wherein each rolling contact joint includes:
        a pair of adjacent links, and wherein each link of the pair of adjacent links includes a first set of pulley structures; and
        at least one cord loop engaged with the first set of pulley structures of each link of the pair of adjacent links, and wherein the pair of adjacent links are configured to roll against one another; and
    at least one flexible actuator attached to the plurality of serially arranged rolling contact joints at a plurality of connections serially arranged along a length of the at least one flexible actuator, wherein the at least one flexible actuator is configured to control a length between the plurality of connections.

2. The robotic limb of claim 1, wherein each link of at least a portion of the plurality of serially arranged rolling contact joints is part of two adjacent rolling contact joints.

3. The robotic limb of claim 1, wherein the at least one flexible actuator is axially fixed to the plurality of connections.

4. The robotic limb of claim 1, wherein the at least one flexible actuator is selected from the group of pneumatic bladders, hydraulic bladders, shape memory actuators, Kirigami actuators, and electroactive polymer actuators.

5. The robotic limb of claim 1, wherein the at least one flexible actuator is two flexible actuators attached to and disposed on opposing sides of the plurality of serially arranged rolling contact joints.

6. The robotic limb of claim 1, wherein each link includes a second set of pulley structures and wherein the at least one cord loop includes a first cord loop engaged with the first set of pulley structures and a second cord loop engaged with the second set of pulley structures.

7. The robotic limb of claim 6, wherein the second set of pulley structures includes a curved portion and a straight portion configured to engage with the second cord loop.

8. The robotic limb of claim 6, wherein the second set of pulley structures have a larger transverse dimension than the first set of pulley structures.

9. The robotic limb of claim 1, further comprising a drum configured to selectively wind and unwind the plurality of serially arranged rolling contact joints from within the drum.

10. The robotic limb of claim 1, wherein each link of the pair of adjacent links includes interlocking features configured to resist relative movement of the pair of adjacent links in a direction out of a plane of bending of the robotic limb.

11. A method for operating a robotic limb comprising:
    actuating at least one flexible actuator attached to a plurality of serially arranged rolling contact joints at a plurality of connections serially arranged along a length of the at least one flexible actuator, wherein the at least one flexible actuator is configured to control a length between the plurality of connections; and
    pivoting the plurality of serially arranged rolling contact joints, wherein each rolling contact joint includes:
        a pair of adjacent links, and wherein each link of the pair of adjacent links includes a first set of pulley structures; and
        at least one cord loop engaged with the first set of pulley structures of each link of the pair of adjacent links, wherein the pair of adjacent links are configured to roll against one another when the rolling contact joint is pivoted.

12. The method of claim 11, wherein each link of at least a portion of the plurality of serially arranged rolling contact joints is part of two adjacent rolling contact joints.

13. The method of claim 11, wherein the at least one flexible actuator is axially fixed to the plurality of connections.

14. The method of claim 11, wherein the at least one flexible actuator is selected from a group of pneumatic bladders, hydraulic bladders, shape memory actuators, Kirigami actuators, and electroactive polymer actuators.

15. The method of claim 11, wherein actuating the at least one flexible actuator includes actuating two flexible actuators attached to and disposed on opposing sides of the plurality of serially arranged rolling contact joints.

16. The method of claim 11, wherein each link includes a second set of pulley structures and wherein the at least one cord loop includes a first cord loop engaged with the first set of pulley structures and a second cord loop engaged with the second set of pulley structures.

17. The method of claim 16, wherein the second set of pulley structures includes a curved portion and a straight portion configured to engage with the second cord loop.

18. The method of claim 16, wherein the second set of pulley structures have a larger transverse dimension than the first set of pulley structures.

19. The method of claim 11, further comprising winding and unwinding the robotic limb from a drum.

20. The method of claim 11, further comprising resisting relative movement of the pair of adjacent links in a direction oriented out of a bending plane of the robotic limb with interlocking features formed on the pair of adjacent links.

* * * * *